(12) United States Patent
Jevans et al.

(10) Patent No.: US 8,505,075 B2
(45) Date of Patent: Aug. 6, 2013

(54) ENTERPRISE DEVICE RECOVERY

(75) Inventors: David Jevans, Menlo Park, CA (US); Gil Spencer, Los Gatos, CA (US)

(73) Assignee: Marble Security, Inc., Sunnyvale, CA (US)

( * ) Notice: Subject to any disclaimer, the term of this patent is extended or adjusted under 35 U.S.C. 154(b) by 663 days.

(21) Appl. No.: 12/434,628

(22) Filed: May 2, 2009

(65) Prior Publication Data

US 2009/0276623 A1 Nov. 5, 2009

Related U.S. Application Data

(63) Continuation-in-part of application No. 11/523,968, filed on Sep. 19, 2006, which is a continuation-in-part of application No. 11/468,799, filed on Jul. 14, 2006.

(60) Provisional application No. 61/126,473, filed on May 2, 2008, provisional application No. 60/718,272, filed on Sep. 19, 2005, provisional application No. 60/698,899, filed on Jul. 14, 2005.

(51) Int. Cl.
*G06F 21/00* (2006.01)

(52) U.S. Cl.
USPC .............................................................. 726/4

(58) Field of Classification Search
USPC .............................................................. 726/4
See application file for complete search history.

(56) References Cited

U.S. PATENT DOCUMENTS

| | | | |
|---|---|---|---|
| 4,578,530 A | 3/1986 | Zeidler | |
| 5,010,571 A | 4/1991 | Katznelson | |
| 5,341,339 A | 8/1994 | Wells | |
| 5,404,485 A | 4/1995 | Ban | |
| 5,457,746 A | 10/1995 | Dolphin | |
| 5,479,638 A | 12/1995 | Assar et al. | |
| 5,857,021 A | 1/1999 | Kataoka et al. | |
| 5,937,425 A | 8/1999 | Ban | |
| 6,032,227 A | 2/2000 | Shaheen et al. | |
| 6,092,196 A | 7/2000 | Reiche | |
| 6,094,721 A * | 7/2000 | Eldridge et al. | 713/168 |
| 6,118,874 A | 9/2000 | Okamoto et al. | |
| 6,223,284 B1 | 4/2001 | Novoa | |

(Continued)

FOREIGN PATENT DOCUMENTS

WO  WO 02/47081 A2  6/2002

OTHER PUBLICATIONS

Army Regulation 380-19. "Information Systems Security." Feb. 27, 1998. Department of the Army. Appendix F. pp. 28-30.

(Continued)

*Primary Examiner* — Michael S McNally
(74) *Attorney, Agent, or Firm* — Fenwick & West LLP (57) ABSTRACT

An administrator of an enterprise can recover a user secure storage device in conjunction with a third-party service without the administrator knowing a user secure storage device password. The administrator secure storage device is communicatively coupled with a host computer. A user secure storage device is communicatively coupled with a host computer. The administrator secure storage device is authenticated to the third-party service. One or more decryptions are performed on an encrypted portion of data with an enterprise private key and a shared administrator private key to produce information associated with the user secure storage device password. The administrator is logged into the user secure storage device using the information associated with the user secure storage device password without the administrator knowing the user secure storage device password.

28 Claims, 5 Drawing Sheets

U.S. PATENT DOCUMENTS

| | | | |
|---|---|---|---|
| 6,292,899 B1 | 9/2001 | McBride | |
| 6,539,480 B1 | 3/2003 | Drews | |
| 6,731,536 B1 | 5/2004 | McClain et al. | |
| 6,763,468 B2 | 7/2004 | Gupta et al. | |
| 6,776,332 B2 | 8/2004 | Allen et al. | |
| 6,791,877 B2 | 9/2004 | Miura et al. | |
| 6,834,795 B1 | 12/2004 | Rasmussen et al. | |
| 6,920,527 B2 | 7/2005 | Cloutier et al. | |
| 6,961,852 B2 | 11/2005 | Craft | |
| 6,987,927 B1 | 1/2006 | Battaglia et al. | |
| 6,993,661 B1 | 1/2006 | Garfinkel | |
| 7,266,699 B2 | 9/2007 | Newman et al. | |
| 7,272,723 B1 | 9/2007 | Abbott et al. | |
| 7,275,139 B1 | 9/2007 | Tormasov et al. | |
| 7,278,025 B2 | 10/2007 | Saito et al. | |
| 7,360,091 B2 | 4/2008 | Aikawa et al. | |
| 7,412,420 B2 | 8/2008 | Holdsworth | |
| 7,475,425 B2 | 1/2009 | Bantz et al. | |
| 7,478,248 B2 | 1/2009 | Ziv et al. | |
| 7,631,191 B2 | 12/2009 | Glazer et al. | |
| 7,685,425 B1 | 3/2010 | Wright et al. | |
| 7,698,442 B1 | 4/2010 | Krishnamurthy et al. | |
| 7,757,088 B2 | 7/2010 | Abdulhayoglu | |
| 7,831,045 B2 | 11/2010 | Junod | |
| 8,015,606 B1 | 9/2011 | Jevans et al. | |
| 2001/0045451 A1 | 11/2001 | Tan et al. | |
| 2002/0029215 A1 | 3/2002 | Whitmyer, Jr. | |
| 2002/0044663 A1 | 4/2002 | King et al. | |
| 2002/0046342 A1 | 4/2002 | Elteto et al. | |
| 2003/0005336 A1 | 1/2003 | Poo et al. | |
| 2003/0041253 A1 | 2/2003 | Matsui et al. | |
| 2003/0149670 A1 | 8/2003 | Cronce | |
| 2003/0149854 A1 | 8/2003 | Yoshino et al. | |
| 2003/0159053 A1 | 8/2003 | Fauble et al. | |
| 2003/0182584 A1 | 9/2003 | Banes et al. | |
| 2003/0204735 A1 | 10/2003 | Schnitzmeier | |
| 2003/0204754 A1 | 10/2003 | Cromer et al. | |
| 2003/0215090 A1 | 11/2003 | Saito et al. | |
| 2004/0059925 A1 | 3/2004 | Benhammou et al. | |
| 2004/0073797 A1 | 4/2004 | Fascenda | |
| 2004/0103288 A1 | 5/2004 | Ziv et al. | |
| 2004/0103325 A1 | 5/2004 | Priebatsch | |
| 2004/0123113 A1 | 6/2004 | Mathiassen et al. | |
| 2004/0146015 A1 | 7/2004 | Cross et al. | |
| 2004/0148333 A1 | 7/2004 | Manion et al. | |
| 2004/0177258 A1 | 9/2004 | Ong | |
| 2004/0188710 A1 | 9/2004 | Koren et al. | |
| 2005/0015540 A1 | 1/2005 | Tsai et al. | |
| 2005/0020315 A1 | 1/2005 | Robertson | |
| 2005/0044377 A1 | 2/2005 | Huang | |
| 2005/0055519 A1 | 3/2005 | Stuart et al. | |
| 2005/0071282 A1 | 3/2005 | Lu et al. | |
| 2005/0182973 A1 | 8/2005 | Funahaski et al. | |
| 2006/0016875 A1 | 1/2006 | Bonalle et al. | |
| 2006/0021059 A1 | 1/2006 | Brown et al. | |
| 2006/0041932 A1* | 2/2006 | Cromer et al. | 726/6 |
| 2006/0047717 A1 | 3/2006 | Pereira | |
| 2006/0069840 A1 | 3/2006 | Corbett et al. | |
| 2006/0095688 A1 | 5/2006 | Kawamura et al. | |
| 2006/0117393 A1 | 6/2006 | Merry et al. | |
| 2006/0129830 A1 | 6/2006 | Haller et al. | |
| 2006/0143476 A1 | 6/2006 | McGovern | |
| 2006/0179309 A1 | 8/2006 | Cross et al. | |
| 2006/0184806 A1 | 8/2006 | Luttmann et al. | |
| 2006/0208066 A1 | 9/2006 | Finn et al. | |
| 2006/0224742 A1 | 10/2006 | Shahbazi | |
| 2006/0236363 A1 | 10/2006 | Heard et al. | |
| 2007/0016743 A1 | 1/2007 | Jevans | |
| 2007/0016756 A1 | 1/2007 | Hsieh et al. | |
| 2007/0028033 A1 | 2/2007 | Hsieh et al. | |
| 2007/0033330 A1 | 2/2007 | Sinclair et al. | |
| 2007/0038802 A1 | 2/2007 | Tsai et al. | |
| 2007/0056043 A1 | 3/2007 | Onyon et al. | |
| 2007/0067620 A1 | 3/2007 | Jevans | |
| 2007/0083939 A1 | 4/2007 | Fruhauf et al. | |
| 2007/0101434 A1 | 5/2007 | Jevans | |
| 2007/0118898 A1 | 5/2007 | Morgan et al. | |
| 2007/0143530 A1 | 6/2007 | Rudelic et al. | |
| 2007/0143532 A1 | 6/2007 | Gorobets et al. | |
| 2007/0160198 A1* | 7/2007 | Orsini et al. | 380/28 |
| 2007/0180509 A1 | 8/2007 | Swartz et al. | |
| 2007/0181698 A1 | 8/2007 | Wilson | |
| 2007/0250919 A1 | 10/2007 | Shull et al. | |
| 2007/0266421 A1 | 11/2007 | Vaidya et al. | |
| 2007/0300031 A1 | 12/2007 | Jevans et al. | |
| 2007/0300052 A1* | 12/2007 | Jevans | 713/1 |
| 2008/0005561 A1 | 1/2008 | Brown et al. | |
| 2008/0040613 A1* | 2/2008 | Challener | 713/185 |
| 2009/0222117 A1 | 9/2009 | Kaplan et al. | |
| 2009/0300710 A1 | 12/2009 | Chai et al. | |
| 2009/0307451 A1 | 12/2009 | Abzarian et al. | |

OTHER PUBLICATIONS

Denning, D.E. et al., "A Taxonomy for Key Escrow Encryption Systems," Communications of the ACM, Mar. 1996, pp. 34-40, vol. 39 Issue 3.

Fischer, V. et al. "True Random Number Generator Embedded in Reconfigurable Hardware." Lecture Notes in Computer Science, Springer-Verlag, 2003, pp. 415-430, vol. 2523.

Gutmann, Peter. "Secure Deletion of Data from Magnetic and Solid-State Memory." USENIX, Sixth USENIX Security Symposium Proceedings, San Jose, California, Jul. 1996, 18 pages, Can be retrieved at <URL:http://www.cs.auckland.ac.nzl-pgut001/pubs/secure_del.html>.

Kingston. "Kingston DataTraveler Elite: Advanced Security and High Performance," DataTraveler Elite White Paper, Oct. 2004, 11 pages, Can be retrieved at <URL:http://www.kingstom.com/digitalmedia/dt_elite.wp.pdf>.

National Institute of Standards and Technology. "Federal Information Processing Standards Publication 197," Nov. 26, 2001, 51 pages.

PCT International Search Report, PCT Application No. PCT/US06/36806, Oct. 23, 2007, 3 pages.

PCT International Written Opinion, PCT Application No. PCT/US06/36806, Oct. 23, 2007, 7 pages.

PCT International Search Report, PCT Application No. PCT/US06/34680, Apr. 1, 2008, 2 pages.

PCT International Written Opinion, PCT Application No. PCT/US06/34680, Apr. 1, 2008, 6 pages.

Sedaghat et al. "A Dynamic Web Agent for Verifying the Security and Integrity of a Web Site's Contents," IEEE, Aug. 2002, pp. 330-337.

Tal, Arie. "Two Technologies Compared: NOR v. NAND", White Paper, 01-SR-012-04-8L, Rev. 1.1, M-Systems Flash Disk Pioneers, Ltd., Jul. 2003, pp. 1-14.

U.S. Appl. No. 11/644,089, entitled "Detachable Storage Device with RAM Cache", filed Dec. 21, 2006, Inventor Jevans, D.

U.S. Appl. No. 11/644,051, entitled "Storage Device with Accessible Partitions", filed Dec. 21, 2006, Inventor Jevans, D.

PCT International Search Report, PCT Application No. PCT/US09/42637, Jun. 19, 2009, 8 pages.

PCT International Search Report, PCT Application No. PCT/US09/42638, Nov. 30, 2009, 8 pages.

* cited by examiner

ENTERPRISE DEVICE RECOVERY

CROSS-REFERENCE TO RELATED APPLICATION

The present application claims the benefit and priority of U.S. Provisional Patent Application No. 61/126,473, filed May 2, 2008 and entitled Enterprise Device Recovery, the disclosure of which is incorporated herein by reference. The present application is also a continuation-in-part and claims the benefit and priority of U.S. patent application Ser. No. 11/523,968, filed Sep. 19, 2006 and entitled Recovery of Encrypted Data from a Secure Storage Device, which claims the benefit and priority of U.S. Provisional Patent Application No. 60/718,272, filed Sep. 19, 2005 and entitled Computer Device Encryption Key and Data Recovery Mechanism. U.S. patent application Ser. No. 11/523,968 is also a continuation-in-part of U.S. patent application Ser. No. 11/468,799, filed Jul. 14, 2006 and entitled Secure Storage Device with Offline Code Entry, which claims the benefit and priority of U.S. Provisional Patent Application No. 60/698,899, filed Jul. 14, 2005 and entitled Secure Storage Device with Offline Password Entry.

The present application is related to U.S. patent application Ser. No. 12/434,630, filed May 2, 2009 and entitled Enterprise Device Policy Management, the disclosure of which is incorporated herein by reference.

BACKGROUND OF THE INVENTION

1. Field of the Invention

The present invention relates generally to data storage devices. More specifically, the present invention relates to the recovery of a secure storage device by an administrator.

2. Related Art

Presently, data can be stored on a secure data storage device such as an external hard drive or a Universal Serial Bus (USB) flash drive, for example. These data storage devices can be secured using encryption techniques. Thus, the contents of a secure data storage device typically cannot be accessed without knowing the correct password. Consequently, if the password is unavailable to an administrator then there is a need in the art to allow the administrator to nevertheless recover the device without compromising security.

SUMMARY OF THE INVENTION

Embodiments of the present invention allow for an administrator of an enterprise to recover a user secure storage device in conjunction with a third-party service without the administrator knowing a user secure storage device password.

In a first claimed embodiment, a method is disclosed for an administrator of an enterprise to recover a user secure storage device in conjunction with a third-party service without the administrator knowing a user secure storage device password. The administrator secure storage device is communicatively coupled with a host computer. A user secure storage device is communicatively coupled with a host computer. The administrator secure storage device is authenticated to the third-party service. One or more decryptions are performed on an encrypted portion of data with an enterprise private key and a shared administrator private key to produce information associated with the user secure storage device password. The administrator is logged into the user secure storage device using the information associated with the user secure storage device password without the administrator knowing the user secure storage device password.

In a second claimed embodiment, a system is set forth for facilitating an administrator of an enterprise to recover a user secure storage device in conjunction with a third-party service without the administrator knowing a user secure storage device password. The system includes an administrator secure storage device communicatively coupled with a host computer. The system further includes a user secure storage device communicatively coupled with a host computer. An administrator recovery module is located on the administrator secure storage device, the administrator recovery module configured to recover a user secure storage device in conjunction with a third-party service without the administrator knowing a user secure storage device password.

A third claimed embodiment includes a computer readable storage medium having a program embodied thereon. The program is executable by a processor to perform a method for an administrator of an enterprise to recover a user secure storage device in conjunction with a third-party service without the administrator knowing a user secure storage device password. The method includes communicatively coupling an administrator secure storage device with a host computer; communicatively coupling the user secure storage device with a host computer; authenticating the administrator secure storage device to the third-party service; performing one or more decryptions on an encrypted portion of data with an enterprise private key and a shared administrator private key to produce information associated with the user secure storage device password; and logging the administrator into the user secure storage device using the information associated with the user secure storage device password without the administrator knowing the user secure storage device password.

DETAILED DESCRIPTION OF EXEMPLARY EMBODIMENTS

The present invention provides methods and systems for an administrator of an enterprise to recover (i.e., attain access to) a user secure storage device in conjunction with a third-party service. In one exemplary embodiment, the administrator is able to achieve recovery without knowing the user secure storage device password.

As mentioned herein, data can be stored on a secure data storage device such as an external hard drive or a Universal Serial Bus (USB) flash drive, for example. Using encryption techniques, these data storage devices can be secured. Therefore, the contents of a secure data storage device typically cannot be accessed without knowing the correct password to the device.

Sometimes a user might go rogue or leave an enterprise (e.g., a company or other entity). In such cases, an administrator of the enterprise should be able to access the user secure data storage device in question. However, for security reasons the user is often the only one to know the user's password to the secure storage device. It is often desirable to not give a user's password to other people in the enterprise, such as administrators and the like. Similarly, it is often undesirable that any third parties involved (such as a device manufacturer) have the user password.

Even if an enterprise's portable devices have been secured against a multitude of potential attacks, a forgotten password to a specific device could render the device inaccessible and result in loss of critical company information if there is not a secure means for device recovery. It might also be desirable to allow an enterprise administrator to access data on the device when an individual is no longer with the organization and change the device owner's password for repurposing the device.

Forgotten passwords constitute a significant percentage of help desk requests. Because of this, data loss due to a forgotten password is a potentially significant problem for enterprise IT managers. However, the ability to recover forgotten passwords carries its own set of security risks, and ensuring proper authentication, authorization, and access are important. For example, even with military-grade device security, a disgruntled insider could potentially gain access to the data on an organization's flash drives if the passwords were stored in a central database for administrators.

It is therefore desirable to allow an enterprise administrator to access a user secure storage device after authenticating with the third party. In some exemplary embodiments, neither the enterprise administrators nor the third party can access the contents of the user secure storage devices alone.

As such, embodiments according to the present invention address the need for an administrator of an enterprise to be able to recover a user secure storage device in conjunction with a third-party service without the administrator knowing a user secure storage device password.

One way of doing this is to wrap the user password, or a symmetric key that encrypts the user password, with each administrator's key. Then the administrator can cause decryption and recovery. However, that method is not very scalable. If an administrator leaves the enterprise of if an administrator is added to the enterprise, then things can get burdensome. For example, if an administrator is added to the enterprise then the various user secure storage devices should be re-encrypted with a new administrator.

Figure 1:
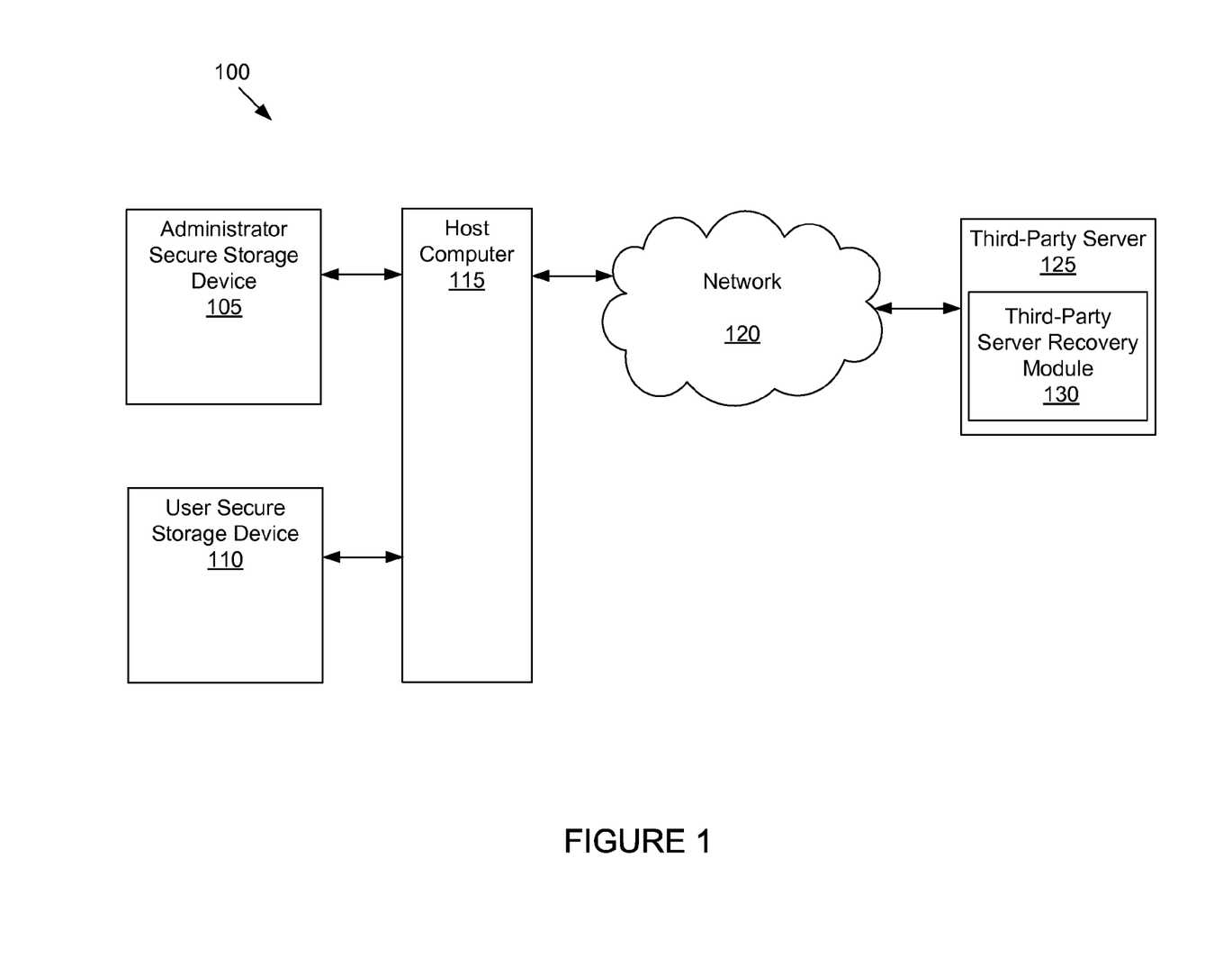
FIG. 1 is a block diagram of an exemplary environment for practicing embodiments of the present invention.

Referring now to FIG. 1, a block diagram of an exemplary environment 100 is presented. As depicted, the environment 100 includes an administrator secure storage device 105, a user secure storage device 110, a host computer 115, a network 120, and a third-party server 125. The administrator secure storage device 105 is communicatively coupled with the host computer 115, which in turn is communicatively coupled with the network 120. Likewise, the user secure storage device 110 is communicatively coupled with the host computer 110. The third-party server 125 is also communicatively coupled with the network 120. It is noteworthy that these communicative couplings may be wireless or wired. In some exemplary embodiments, the communicative coupling is done over a secure channel, or secure communication path.

Additionally, as illustrated in FIG. 1 and explained in further detail herein, the third-party server 125 includes a third-party server recovery module 130. The third-party server recovery module 130 can be stored as software, firmware, hardware, as a combination, or in various other ways. The third-party server recovery module 130 is configured to facilitate the recovery of the user secure device 110.

It is contemplated that the administrator secure storage device 105 and the user secure storage device 110 can each include any device that is capable of storing digital information. In one embodiment according to aspects of the present invention, the administrator secure storage device 105 and the user secure storage device 110 can be removable or unpluggable data storage devices (e.g., USB drives). The administrator secure storage device 105 and the user secure storage device 110 can be portable in one embodiment, but they are not limited to portable devices. For illustrative purposes, the administrator secure storage device 105 and the user secure storage device 110 are described herein in the context of USB flash drives. The administrator secure storage device 105 and the user secure storage device 110 are discussed in further detail in connection with FIG. 2.

The host computer 115 includes any computing device that can interface with the administrator secure storage device 105 and the user secure storage device 110. Examples of the host computer 115 include a personal computer (PC), a personal digital assistant (PDA), a Smartphone, and other various devices. The host computer 115 includes one or more communications interfaces (not depicted) to facilitate communicative coupling with the secure storage devices. Additionally, the host computer 115 can include a processor, memory such as random access memory (RAM), and storage such as read-only memory (ROM) (which are not depicted). Those skilled in the art will be familiar with the components and functionality of computing devices such as the host computer 115.

The host computer 115 can include a control panel (not depicted). According to exemplary embodiments, the control panel can be effectuated by instructions that are executed by the processor of the host computer 115. The control panel can also allow a user to manage digital information stored within the administrator secure storage device 105 and the user secure storage device 110.

These instructions can be stored within the administrator secure storage device 105 and the user secure storage device 110 and retrieved by the host computer 115 for execution. In one embodiment, these instructions can be stored as software in control panel modules in the administrator secure storage device 105 and the user secure storage device 110. However, it is contemplated that the instructions can be stored as software, firmware, hardware, as a combination, or in various other ways. It is also envisioned that the instructions associated with the control panel can be stored by the host computer 115, or stored remotely and accessed by the host computer 115 via a network such as the network 120.

The network 120 can be a wide-area network and include a private network (e.g., a leased line network) or a public network (e.g., the Internet). In some embodiments, the network 120 can be a local area network and cover a relatively small geographic range. Local area networks include wired networks (e.g., Ethernet) or wireless networks (e.g., Wi-Fi). The network 120 includes hardware and/or software elements that enable the exchange of information (e.g., voice and data) between the third-party server 125 and the administrator secure storage device 105, the user secure storage device 110, or the host computer 115. Routers or switches may be used to connect the network 125 with the host computer 115 and the third-party server 125.

The third-party server 125 includes any computing device that can interface with the network 120. Generally speaking, the third-party server 125 provides services via the network 120 used by other computers and devices such as the host computer 115. The third-party server 125 includes one or more communications interfaces (not depicted) to facilitate communicative coupling with the network 120. Additionally, the third-party server 125 includes a processor, memory such as RAM, and storage such as ROM (which are not depicted).

Those skilled in the art will be familiar with the components and functionality of computing devices such as the third-party server 125.

Figure 2:
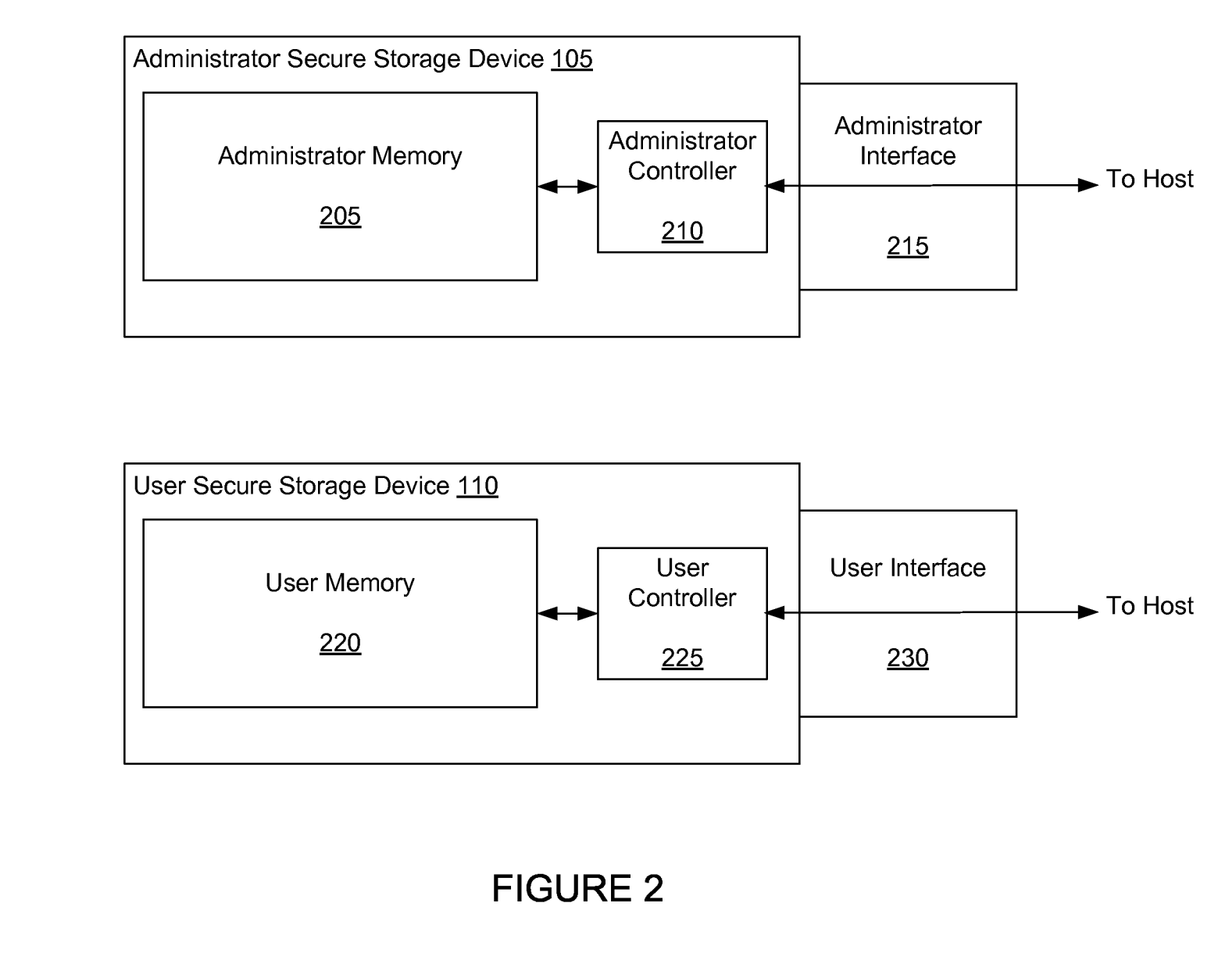
FIG. 2 is a block diagram of exemplary secure storage devices employed in the environment of FIG. 1.

FIG. 2 is a block diagram of the exemplary administrator secure storage device 105 and user secure storage device 110 employed in the environment 100 of FIG. 1. Both the administrator secure storage device 105 and the user secure storage device 110 can be any device that is used to store digital information, and in one embodiment they are portable.

The administrator secure storage device 105 depicted in FIG. 2 can include an administrator memory 205, an administrator controller 210, and an administrator interface 215, which is a USB interface in one embodiment. Similarly, the user secure storage device 110 depicted in FIG. 2 can include a user memory 220, a user controller 225, and an administrator interface 230, which is a USB interface in one embodiment.

Both the administrator memory 205 and the user memory 220 can include a computer-readable storage medium. While common forms of computer-readable storage media include, for example, a floppy disk, a flexible disk, a hard disk, magnetic tape, any other magnetic medium, a CD-ROM disc, digital video disc (DVD), and any other optical medium, the administrator memory 205 and the user memory 220 are described in the context of non-volatile memory that can be electrically erased and rewritten. Examples of such non-volatile memory include NAND flash and NOR flash. Additionally, the administrator memory 205 and the user memory 220 can comprise other existing memory technologies. The administrator memory 205 and the user memory 220 can also comprise various other memory technologies as they become available in the future.

Figure 3:
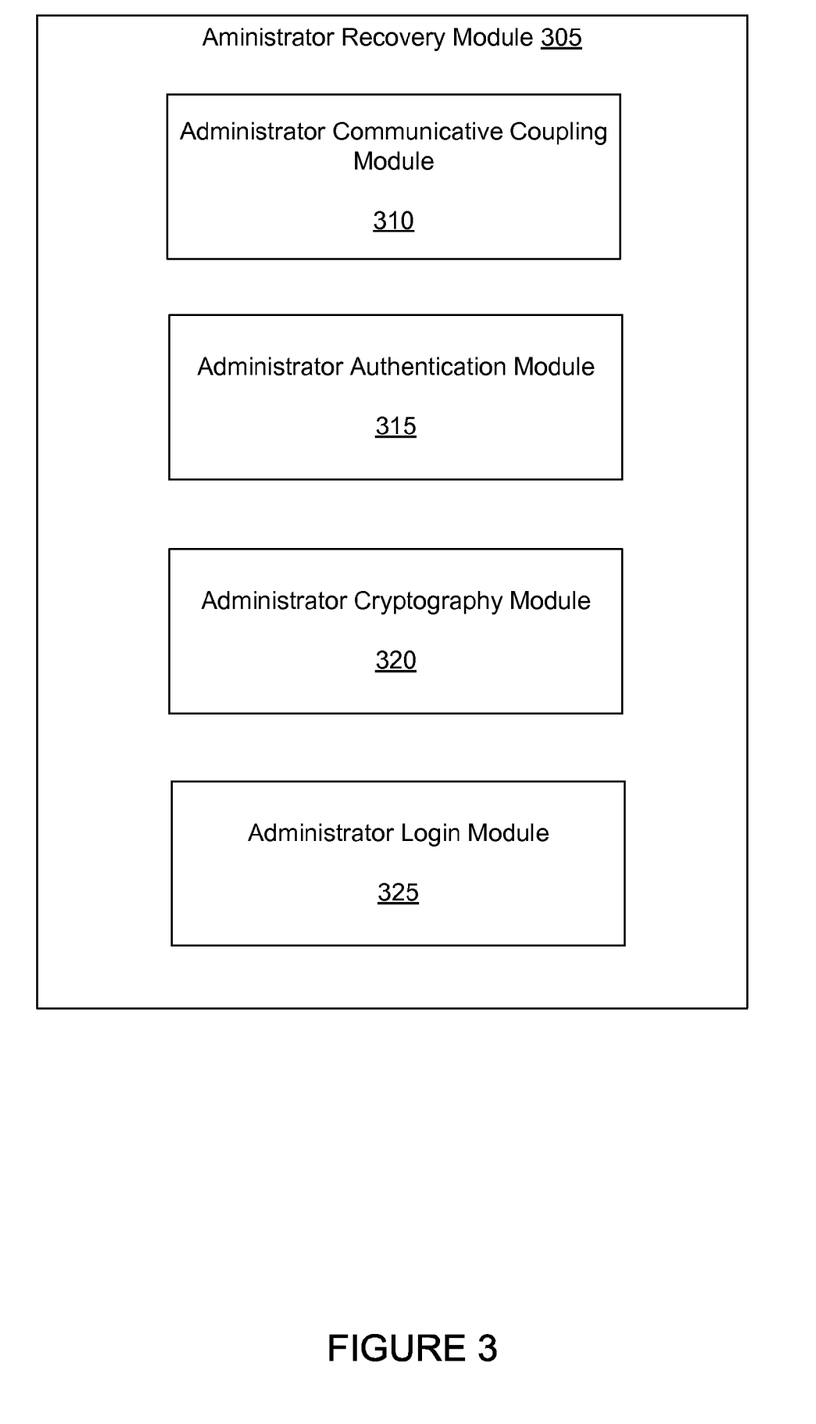
FIG. 3 is a block diagram of an exemplary administrator recovery module included in the administrator secure storage device of FIG. 2.

The administrator controller 210 can be a processor or microcontroller with an amount of on-chip ROM and/or RAM. The administrator controller 210 is communicatively coupled with the administrator memory 205 and the administrator interface 215. Additionally, the administrator controller 210 can include software and/or firmware that can execute various modules, such as the administrator recovery module 305 described herein. As such, the administrator controller 210 functions as an intermediary between the host computer 115 and the administrator memory 205. For example, the administrator controller 210, or various modules executed thereby, can receive write commands from the host computer 115 and determine how data associated with those write commands is to be managed with respect to the administrator memory 205. Additionally, the administrator controller 210 can include a random number generator (RNG) for randomly generating an encryption key, such as, for example, an Advanced Encryption Standard (AES) encryption key. Alternatively, the RNG can be located elsewhere.

Figure 4:
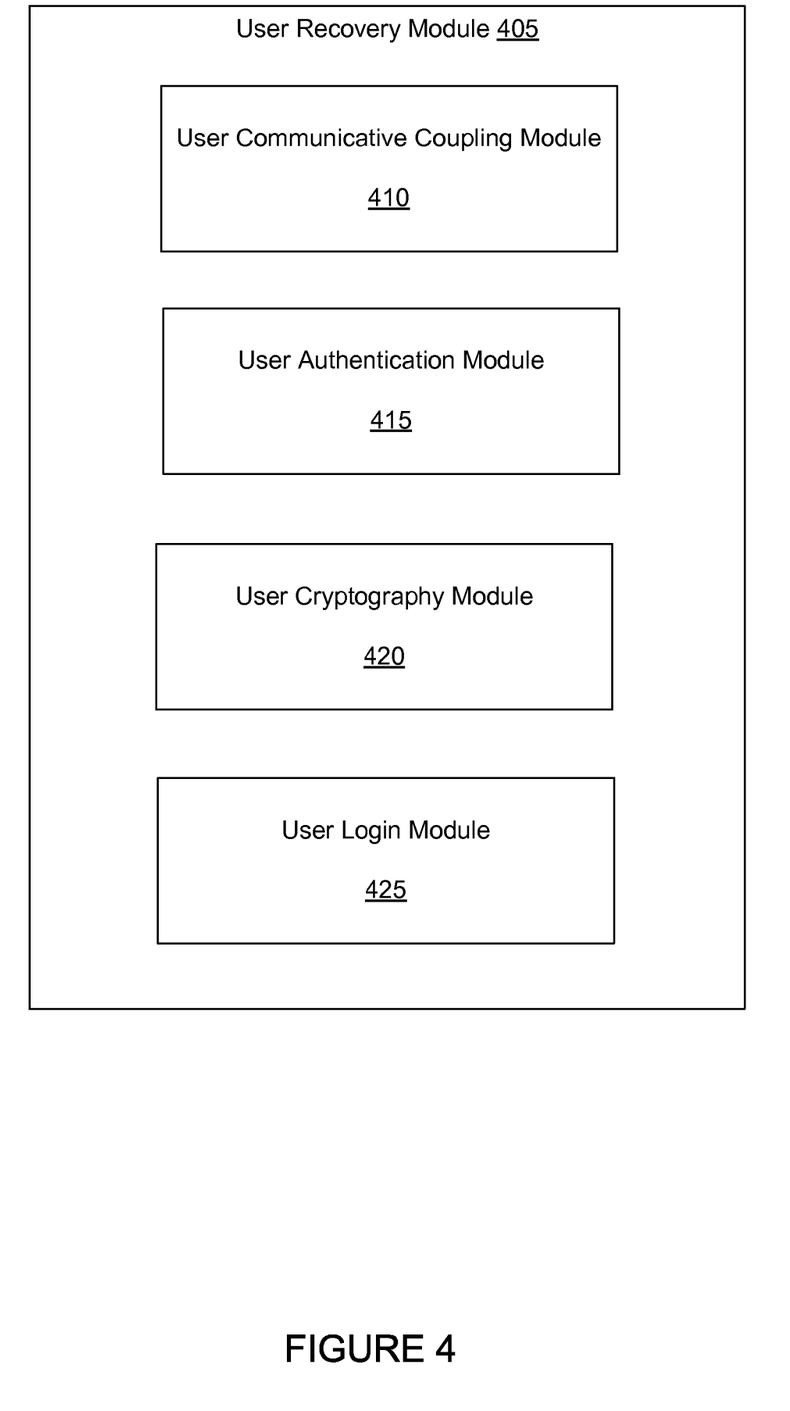
FIG. 4 is a block diagram of an exemplary user recovery module included in the user secure storage device of FIG. 2.

Likewise, the user controller 225 can be a processor or microcontroller with an amount of on-chip ROM and/or RAM. The user controller 225 is communicatively coupled with the user memory 220 and the user interface 230. Additionally, the user controller 225 can include software and/or firmware that can execute various modules, such as the user recovery module 405 described herein. As such, the user controller 225 functions as an intermediary between the host computer 115 and the user memory 220. For example, the user controller 225, or various modules executed thereby, can receive write commands from the host computer 115 and determine how data associated with those write commands is to be managed with respect to the user memory 220. Additionally, the user controller 225 can include an RNG for randomly generating an encryption key, such as, for example, an AES encryption key. Alternatively, the RNG can be located elsewhere.

As mentioned herein, the administrator secure storage device 105 and the user secure storage device 110 can be communicatively coupled with the host computer 115 in either a wireless or wired manner. The administrator interface 215 facilitates this coupling by allowing information to be transferred between the administrator secure storage device 105 and the host computer 115. Similarly, the user interface 230 facilitates this coupling by allowing information to be transferred between the user secure storage device 110 and the host computer 115.

In exemplary embodiments, the administrator interface 215 and the user interface 230 each include a USB plug that is insertable into a mating USB port of the host computer 110. Alternatively, the administrator interface 215 and the user interface 230 can include other standards for communicative coupling such as FireWire, Ethernet, Wireless USB, ESATA, Bluetooth, or other standards. Furthermore, the administrator interface 215 and the user interface 230 can comprise other interface technologies as they become available.

In keeping with embodiments according to the present invention, FIG. 3 is a block diagram of the exemplary administrator recovery module 305 included in the administrator secure storage device of FIG. 2.

The administrator recovery module 305, and the modules it includes, can be stored as software, firmware, hardware, as a combination, or in various other ways. The administrator recovery module 305 is configured to facilitate the recovery of the user secure device 110, described herein.

In accordance with various embodiments, the administrator recovery module 305, or certain modules thereof, can be included in the administrator controller 210 and/or the administrator memory 205 of the administrator secure storage device 105. It is also contemplated that various modules can be included in any other suitable locations.

The administrator recovery module 305 includes an administrator communicative coupling module 310, an administrator authentication module 315, an administrator cryptography module 320 (e.g., an administrator cryptography processor), and an administrator login module 325. In various embodiments, additional modules can be included in the administrator recovery module 305, and those modules and the modules listed can be removed or located elsewhere.

The administrator communicative coupling module 310 is configured to set up a secure communication path between the administrator secure storage device 105 and the host computer 115. The administrator authentication module 315 is configured to authenticate the administrator to the third-party service. The administrator cryptography module 320 can encrypt and decrypt. The administrator login module 325 is configured to log an individual into a secure storage device or other system. However, a control panel does this in one embodiment.

FIG. 4 is a block diagram of an exemplary user recovery module 405 included in the user secure storage device of FIG. 2.

The user recovery module 405, and the modules it includes, can be stored as software, firmware, hardware, as a combination, or in various other ways. The user recovery module 405 is configured to facilitate the recovery of the user secure storage device 110, described herein.

In accordance with various embodiments, the user recovery module 405, or certain modules thereof, can be included in the user controller 225 and/or the user memory 220 of the user secure storage device 110. It is also contemplated that various modules can be included in any other suitable locations.

The user recovery module 405 includes a user communicative coupling module 410, a user authentication module 415, a user cryptography module 420 (e.g., a user cryptography processor) 420, and a user login module 425. In various embodiments, additional modules can be included in the user recovery module 405, and those modules and the modules listed can be removed or located elsewhere.

The user communicative recovery module 405 is configured to set up a secure communication path between the user secure storage device 110 and the host computer 115. The user authentication module 415 is configured to authenticate the user to the third-party service. The user cryptography module 420 can encrypt and decrypt. The user login module 425 is configured to log an individual into a secure storage device or other system. However, a control panel does this in one embodiment.

In keeping with aspects of the invention, in one embodiment, the administrator memory 205 can include a control panel module, mentioned herein. Likewise, the user memory 220 can include a control panel module. In alternate embodiments, the control panel modules can be stored in a private area on the secure storage devices that is not accessible by the user.

The control panel modules can be software that includes instructions in the form of, for example, software for running a control panel on the host computer 115. As mentioned herein, control panel modules are not limited to being software.

In keeping with embodiments according to the present invention, employee passwords and data can be securely recovered and security policies can be specified. An administrator of an enterprise can recover a user secure storage device 110 in conjunction with a third-party service. During provisioning of the user secure storage device 110, a device password recovery box (e.g., an area of NAND memory) is initialized. A random password is then set to limit access to the device recovery box. A random device recovery box password is then stored on a website of the third-party. In one embodiment, a recovery box password is generated during device activation time, not provisioning time. A device public key is exported in native format and sent to the third-party service. Next, a flag is set in a non volatile configuration area to specify that the user secure storage device 110 is an enterprise device (i.e., a device of the organization in question).

An enterprise initialization/super administrator phase comes next. A super administrator of the enterprise accesses the third-party website, creates an enterprise account, and enters email addresses. The super administrator then sets a password policy, application policy, backup policy, etc. on the third-party website. The third-party service, sometimes referred to herein simply as "third party," generates an enterprise keypair in a hardware security module (HSM). The third party also exports a public key into an enterprise policy file. The third party then emails the super administrator the user activation code. The super administrator plugs the user secure storage device 110 into the host computer 115. The super administrator then enters the activation code and the user email address into the host computer 115. The user secure device 110 then uses a default password to unlock the user secure storage device 110, and uses a cryptographic token interface (Cryptoki) standard such as, for example, PKCS #11. The user secure storage device 110 sends the activation code and email address to the third party.

The third party subsequently returns a policy file signed with the server private key or error code. A super administrator secure storage device stores policy into the policy box, verifies policy file with the server public key in firmware, and if it passes sets the policy selector to the new policy. The super administrator sets a password on a super administrator secure storage device validated by the password policy file. The super administrator signs onto the third-party service with, for example, a third-party web browser. The device is bound to the enterprise account. The third party sends back a message indicating that super administrator status has been attained. The super administrator secure storage device generates a shared administrator keypair in software on the host computer 115. Both the private and public component of the shared administrator keypair are encrypted with the device's public key and sent to the third party. Also uploaded is a shared public key in clear which goes down in the policy for the other standard users.

At this point, the administrator can now invite users into the enterprise. The administrator logs into the website and ensures that the policy has been created. The administrator then adds the email addresses of users that are to be invited into the enterprise.

The user now initializes the user secure storage device 110. The user receives an invitation email with an activation code. The user plugs the user secure storage device 110 into the host computer 115. However, it is envisioned that any suitable type of communicative coupling with suffice. The user subsequently enters both the user's activation code from the email, and the user's email address, into the activation screen that is initially displayed.

Over a secure (e.g., encrypted) channel with the third-party service, the user secure storage device 110 exchanges the ID of the user secure storage device 110, the activation code, and the email address for the enterprise policy. The third-party server 125 then links the email address and activation code with the correct policy and returns a policy signed with the private key of the third-party server 125 to the user secure storage device 110. The user secure storage device 110 subsequently imports this policy into its policy box. In the policy box, there are, in one embodiment, two slots for importing policies. The user secure storage device 110 writes the policy into the currently unused slot.

Next, the user secure storage device 110 checks the signature of the policy using the public key of the third-party server 125. If the signature check passes, the firmware sets a nonvolatile flag to mark this as the current policy of the user secure storage device 110. The initialization flow then proceeds to the subsequent screen, which allows the user to set the user secure storage device password, and insures that this password complies with the password policy of the enterprise.

If the administrator password recovery has been selected in the enterprise policy, then the control panel asks the user secure storage device 110 to randomly generate a key. In one exemplary embodiment the key is a 256-bit AES key+16 byte IV. However, it is contemplated that other types and sizes of keys can be implemented, such as, for example, a 128-bit key. Also, if the administrator password recovery has been selected in the enterprise policy, then the control panel causes encryption of a hash (or any suitable kind of function) of the user secure storage device password with this AES key+IV, and then causes a double encryption the AES key (and a hash of the AES key) first with a shared administrator public key, and then with an enterprise public key. In one embodiment the hash can be a SHA256 hash. The encryption algorithms can be of various types, such as, for example, AES-CBC or RSA.

After double-encryption, the entire encrypted portion of data, (e.g. a blob) might be 256 bytes in one embodiment. The result of the double encryption is stored into the password recovery box of the user secure storage device 110.

Figure 5:
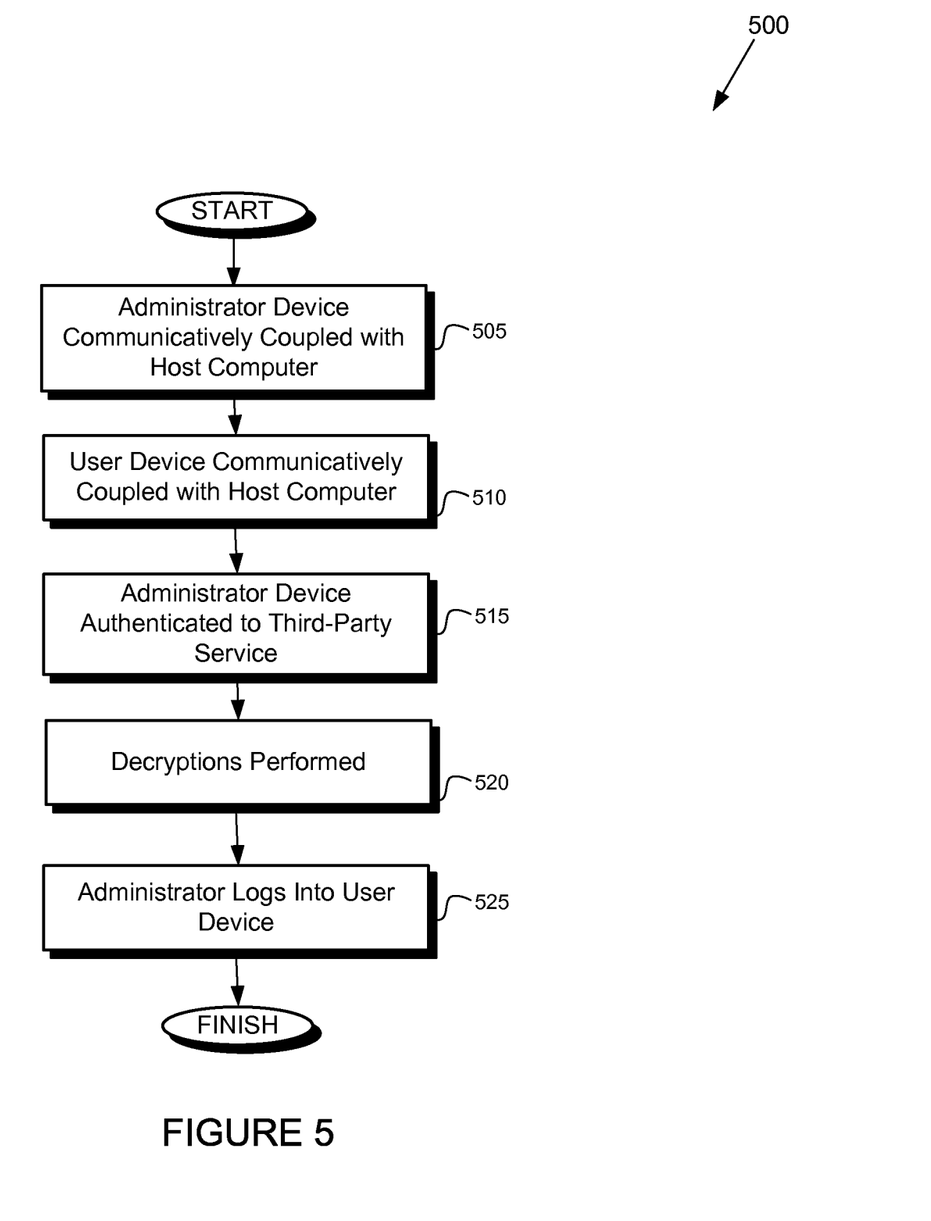
FIG. 5 is a flowchart of an exemplary method for recovering the user secure storage device of FIG. 1.

FIG. 5 is a flowchart 500 of an exemplary method for recovering the user secure peripheral device of FIG. 1. In one embodiment, at step 505, the administrator causes the administrator secure storage device 105 to be communicatively coupled with the host computer 115. For example, the administrator plugs the administrator secure storage device 105 into the host computer 115, and the administrator communicative coupling module 310 sets up a secure communication path between the administrator secure storage device 105 and the host computer 115 through the administrator interface 215.

The administrator then logs the administrator secure storage device 105 into the third-party service. This foregoing could also be phrased as "the administrator logs in to the third party."

The administrator secure storage device 105 is then authenticated to the third-party service via the third-party server recovery module 130. In one embodiment, this can be accomplished by pushing a button.

The third party, via the third-party server recovery module 130, returns a message stating that the administrator is indeed an administrator. Alternatively, the third party returns an error. This is a potential point of revocation. Next, the administrator secure storage device 105 causes an administrator console to be displayed on the host computer 115.

At step 510, the administrator causes the user secure storage device 110 to be communicatively coupled with the host computer 115. For example, the administrator plugs the user secure storage device 110 into the host computer 115, and the user communicative coupling module 410 sets up a secure communication path between the user secure storage device 110 and the host computer 115 through the user interface 230. The administrator then selects the user secure storage device 110 from an administrator tab device popup.

At step 515, the administrator secure storage device 105 can be authenticated to the third-party service via the administrator authentication module 315.

If the administrator is authenticated and authorized, the password for the device password recovery box and the shared administrator keypair are sent to the administrator secure storage device 105, and the administrator secure storage device 105 temporarily imports the shared administrator keypair.

The key imports are encrypted by the administrator cryptography module 320 with a device public key. The key imports are signed by the third-party server private key. The key import is therefore verified by the administrator secure storage device 105 in firmware with the third-party server public key and decrypted with the administrator secure storage device 105 private keypair. Thus, it is ensured, in one embodiment, that this is the only device can import the key and only keys signed by the third-party can be imported. However, in alternate embodiments other devices can import the key and keys other than those signed by the third-party can be imported.

The administrator secure storage device 105 now has the password to the user secure storage device password recovery box, so it unlocks the password recovery box of the user secure storage device 110 and reads the password recovery data.

At step 520, the encrypted key portion (a third encrypted portion of data) of the recovery data is sent to the third-party server recovery module 130 for decryption with the enterprise private key to produce a second encrypted portion of data. In one embodiment, the resulting second encrypted portion of data, concatenated with the encrypted user secure storage device password, is then sent to the administrator secure storage device 105 by the control panel, and decrypted on the administrator secure storage device 105 by the administrator cryptography module 320 using the shared administrator private key (that was just imported) to produce a first encrypted portion of data. In order to verify the AES key, the administrator secure cryptography module 320 generates a hash of the decrypted AES key and compares it with the hash that is stored in the recovery data.

Now that the AES key has been recovered, information associated with the user password (e.g. the hash of the user secure storage device password in one embodiment) can be decrypted by the administrator cryptography module 320 and the hash is returned to the administrator control panel.

At step 525, the administrator control panel uses this information associated with the user secure storage device password hash to login to the user secure storage device 110.

In exemplary embodiments, the administrator does not know the actual (ASCII in one embodiment) user secure storage device password because a hash of the password is what is stored, and a hash function is a one-way encryption algorithm.

In exemplary embodiments according to the present invention, when the user secure storage device password is changed on the user secure storage device 110, an RNG in the user controller 225 (and on the user cryptography module 320 in some embodiments) generates a new AES key. The user cryptography module 320 then double encrypts it with the shared administrator public key and the enterprise public key. This procedure is similar to or the same as what is done during user initialization, described herein.

In one embodiment, it can be specified which applications can be on a user secure storage device 110. Policies can be set on the user secure storage devices 110 by, for example, an administrator (or a super administrator). For example, a security policy (or any other suitable type of policy) can be set. Examples of this can include how many password retries a user has, what the strength of the user secure storage device password needs to be, whether the password has to be backed-up, etc. An administrator also has the ability to add other administrators.

It should be noted that an administrator, in one embodiment, is a person who can recover a user secure storage device. In another embodiment, an administrator is a person who is authorized and authenticated. It is contemplated that an administrator can be defined in various other ways as well.

Furthermore, there are different roles that administrators can assume. There are different levels of administrators. These levels can include administrator, super administrator, and others. It can be specified whether an administrator has privileges to, for example, authorize other administrators, whether an admin can create policy, etc. There can be various different levels of hierarchy and permissions for administrators.

Mentioned herein are just some examples of things administrators can do in various embodiments. It is envisioned that various other suitable administrator privileges can be implemented.

In another embodiment, an administrator can specify what applications can be on user secure storage devices 110. For example, an administrator can set a policy that dictates that a browser such as Firefox is allowed to reside on a given user secure storage device 110. The respective user is then given access to the application on the control panel.

In another embodiment, there can be an enterprise-selectable set of applications. A group of users can be defined, and the group can have a given set of applications on their device. An enterprise can determine various groups of users and respective sets of applications associated therewith. An enterprise can even upload their own custom applications and have them deployed on desired devices.

In exemplary embodiments, administrators of an enterprise are in charge of which applications, or other items, are allowed onto the user secure storage devices 110. These applications may be on a CD of a device and uncompressed, or they may be external to the CD and directed by the administrator to be downloaded onto the device at the next time the device is communicatively coupled with a host computer.

In one embodiment related to two-factor authentication, a user can download a new policy that indicates that the user has an RSA secure ID. In the control panel a soft token version of an RSA secure ID (or other one-time password) can be provided. The user enters their password and then this ID number. This feature can be part of the control panel and can be enabled by policy. An administrator can say specify that certain users or groups of users have RSA secure ID tokens on their devices.

In one embodiment, the user secure storage device 110 generates the one-time password. This process can be automated. A secret can be stored in the device.

In various embodiments, an enterprise can create a set of applications that resides on the devices when they are shipped to the enterprise. In the policy, an administrator can choose which of those predetermined applications are desired. In another embodiment, an administrator can create a set of custom applications.

The administrator could send the applications to the third-party service, and when a device was initialized it could pull those applications down from the third-party service. And those applications could also be cached on a local server inside the enterprise, for example.

As mentioned herein, one of the things that an administrator can do is set policy about what applications can be on a device. An administrator can manage policy on the devices. Examples include the security policy, what applications are allowed on the device, whether the device has to authenticate with the third-party service before the user can log in, etc.

Various features can be set at manufacturing time. An administrator can choose whether or not a given feature is enabled. In another embodiment, a user can control whether a feature is enabled. In yet another embodiment, the administrator can also control whether or not the user can control whether a feature is enabled.

In one example, an administrator can set in policy whether password recovery is enabled (i.e., whether a device can perform password recovery). The administrator can set in policy whether the user must do password recovery or whether the user cannot do password recovery.

The administrator can set whether the user has to backup their passwords. The various enterprise features can be enabled or disabled. One way that can be accomplished is by creating a policy that enables or disables a given feature. In another embodiment, the user can enable or disable features.

For example, a feature such as password recovery might be set to be on by default. However, in one embodiment the user can change that and turn the feature off. In another embodiment the user does not have this ability to turn features on or off.

In one embodiment, the administrator could require that every time the device is plugged in and the user attempts to access the content, the device contacts the third-party service for authentication. The third-party service can allow the user access or, if the user has gone rogue or otherwise should not have access, the third-party service can deny access and/or cause the device to self-destruct.

In other embodiments, a user can get a code from the third-party service and recover the user secure storage device 110 that way, assuming the user secure storage device is plugged in. In an alternate embodiment, the user can accomplish this remotely by contacting the third-party service to get a code. The user then enters that one-time code into the user secure storage device 110 in order to recover the device. The user can call in to the third-party service to get the code. In another embodiment, the user can go online in order to get the code (i.e., password) in a form of user self-device recovery.

Alternatively, a user can back-up the password to a third-party website. The administrator is the one who can go into the website to look at the password and give it to the user.

In summary, there are various ways to remotely recover a device that are contemplated. As mentioned herein, a user can call an administrator and/or a third-party service. The administrator accesses a console on the web and generate a one-time password, which is then given to the user. The user can use that one-time password to login to the user secure storage device 110 via a console, for example.

In another embodiment, as mentioned herein, a user's password is backed-up to a website. The administrator has access to the website.

In yet another embodiment, mentioned herein, a technique for user password self-recovery is implemented. The user does not know their device password, and cannot login to their device. The user instead accesses a third-party website, for example, and is asked verification questions (e.g., mother's maiden name, father's middle name, etc.) If the user answers all, or a certain subset, of the questions correctly then the user can see what their password is.

A user can contact a third-party service directly (by web or phone) to get the password or a one-time password. Alternatively, a user can contact an administrator, and the administrator can contact the third-party service directly (by web or phone). In any of these scenarios, it is possible that verification questions may be posed. All possible permutations are contemplated.

Thus, a system and method have been disclosed for an administrator of an enterprise to recover a user secure storage device in conjunction with a third-party service without the administrator knowing a user secure storage device password. Not only can data be recovered by an authorized administrator, but lost, stolen, or rogue drives can be remotely destroyed in various embodiments. Access of terminated employees can be revoked. Administrator-assisted password reset can be accomplished. In some exemplary embodiments, the administrator cannot recover a user secure storage device 110 without being authorized and authenticating to a third-party service. Similarly, the third-party service, in some embodiments, cannot recover a user secure storage device 110 without the cooperation of an administrator of the enterprise. The user password is known only to the user is some exemplary embodiments.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for an administrator of an enterprise to recover a user secure storage device in conjunction with a third-party service without the administrator knowing a user secure storage device password, the method comprising:
   communicatively coupling an administrator secure storage device with a host computer;
   communicatively coupling the user secure storage device with the host computer;
   authenticating the administrator secure storage device to the third-party service;
   causing one or more decryptions on an encrypted portion of data stored in a recovery box on the user secure storage device, the one or more decryptions performed with an enterprise private key generated by the third-party service, with a shared administrator private key generated by the administrator secure storage device, and with a user key generated by the user secure storage device to produce information associated with the user secure storage device password; and
   logging the administrator into the user secure storage device using the information associated with user secure storage device password without the administrator knowing the user secure storage device password.

2. The method of claim 1, wherein an administrator cannot recover the user secure storage device without being authorized and authenticating to the third-party service.

3. The method of claim 1, wherein the third-party service cannot recover a user secure storage device without cooperation of an administrator.

4. The method of claim 1, further comprising specifying which applications can be on the user secure storage device.

5. The method of claim 1, wherein the information associated with the user secure storage device password comprises a hash of the user secure storage device password.

6. The method of claim 1, wherein the information associated with the user secure storage device password comprises the user secure storage device password.

7. The method of claim 1, further comprising receiving, at the administrator secure storage device, a password for the recovery box on the user secure storage device.

8. The method of claim 1, further comprising receiving, at the administrator secure storage device, a shared administrator keypair generated by the administrator secure storage device, the shared administrative key pair including the administrator private key.

9. The method of claim 1, further comprising taking a hash of a key and comparing the result against a stored value.

10. The method of claim 9, wherein the stored value is a hash of a key.

11. The method of claim 1, further comprising obtaining password recovery data having an encrypted key portion.

12. The method of claim 1, further comprising decrypting a third encrypted portion of data with the enterprise private key to produce a second encrypted portion of data.

13. The method of claim 12, further comprising decrypting the second encrypted portion of data with the shared administrator private key to produce a first encrypted portion of data.

14. The method of claim 13, wherein the first encrypted portion of data comprises a first key and a hash of a second key, the method further comprising taking a hash of the first key to determine if there is a match with the hash of the second key.

15. The method of claim 14, wherein the hash of the first key is the same as the hash of the second key.

16. The method of claim 14, further comprising:
   decrypting the hash of the user secure storage device password with a key that was used for encrypting the hash of the user secure storage device password; and
   submitting a decrypted hash of the user secure storage device password to the user secure storage device for login.

17. The method of claim 16, wherein the key used to encrypt the hash of the user secure storage device password is a randomly generated key.

18. A system for facilitating an administrator of an enterprise to recover a user secure storage device in conjunction with a third-party service without the administrator knowing a user secure storage device password, the system comprising:
   an administrator secure storage device communicatively coupled with a host computer;
   the user secure storage device communicatively coupled with a host computer; and
   an administrator recovery module located on the administrator secure storage device, the administrator recovery module configured to recover a user secure storage device in conjunction with a third-party service without the administrator knowing a user secure storage device password, the administrator recovery module causing one or more decryptions on an encrypted portion of data with an enterprise private key generated by the third-party service, with a shared administrator private key generated by the administrator secure storage device, and with a user key generated by the user secure storage device.

19. The system of claim 18, wherein the administrator recovery module includes an administrator authentication module.

20. The system of claim 19, wherein the administrator recovery module includes an administrator cryptography module.

21. The system of claim 18, further comprising a password recovery box located on the user secure storage device, wherein the administrator secure storage device is configured to receive a password for the password recovery box.

22. The system of claim 18, further comprising a shared administrator keypair that is received at the administrator secure storage device.

23. The system of claim 18, wherein the administrator recovery module further comprises an administrator cryptography module that is configured to decrypt a third encrypted portion of data with the enterprise private key to produce a second encrypted portion of data.

24. The system of claim 23, wherein the administrator cryptography module is further configured to decrypt the second encrypted portion of data with the shared administrator private key to produce a first encrypted portion of data.

25. The system of claim 24, wherein the first encrypted portion of data comprises a first key and a hash of a second key, the administrator cryptography module further configured to take a hash of the first key to determine if there is a match with the hash of the second key.

26. The system of claim 25, wherein the hash of the first key is the same as the hash of the second key.

27. The system of claim 26, wherein the administrator cryptography module is configured to decrypt the hash of the user secure storage device password with a key that was used for encrypting the hash of the user secure storage device password, wherein the decrypted hash of the user secure storage device password is then submitted to the user secure storage device for login.

28. A non-transitory computer readable storage medium having a program embodied thereon, the program executable by a processor to perform a method for an administrator of an enterprise to recover a user secure storage device in conjunction with a third-party service without the administrator knowing a user secure storage device password, the method comprising:

receiving a shared administrator keypair generated by an administrator secure storage device and comprising an administrator public key and an administrator private key;

receiving an enterprise keypair generated by the third-party service and comprising an enterprise public key and an enterprise private key;

receiving a user key generated by the user secure storage device;

producing first encrypted data by encrypting data associated with the user secure storage device password using the generated user key;

producing second encrypted data by encrypting the first encrypted data with the administrator public key and the enterprise public key;

performing one or more decryptions on the second encrypted data with the enterprise private key, the administrator private key, and the user key to produce information associated with the user secure storage device password; and logging the administrator into the user secure storage device using the information associated with the user secure storage device password without the administrator knowing the user secure storage device password.

\* \* \* \* \*